United States Patent
Xu et al.

(10) Patent No.: US 10,551,651 B2
(45) Date of Patent: Feb. 4, 2020

(54) SUBSTRATE SUPPORT DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Min Xu, Beijing (CN); Chuang Gao, Beijing (CN); Kai Wu, Beijing (CN); Jiajia Shan, Beijing (CN); Yu Yang, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 119 days.

(21) Appl. No.: 15/701,628

(22) Filed: Sep. 12, 2017

(65) Prior Publication Data

US 2018/0203284 A1     Jul. 19, 2018

(30) Foreign Application Priority Data

Jan. 13, 2017    (CN) .......................... 2017 2 0040214

(51) Int. Cl.
     *G02F 1/1333*      (2006.01)
     *G02F 1/136*      (2006.01)

(52) U.S. Cl.
     CPC ........ *G02F 1/133308* (2013.01); *G02F 1/136* (2013.01); *G02F 2001/133322* (2013.01); *G02F 2001/133325* (2013.01); *G02F 2001/133354* (2013.01)

(58) Field of Classification Search
CPC .. G02F 1/133308; G02F 1/136; G02F 1/1303; G02F 2001/133322
See application file for complete search history.

(56) References Cited

U.S. PATENT DOCUMENTS

| | | | | |
|---|---|---|---|---|
| 6,068,160 | A * | 5/2000 | Fancher | ................... A23G 9/28 222/334 |
| 2009/0122252 | A1* | 5/2009 | Hirato | ................... G02F 1/1341 349/189 |
| 2016/0320124 | A1 | 11/2016 | Xing et al. | |
| 2016/0372343 | A1 | 12/2016 | Wang et al. | |
| 2017/0170046 | A1 | 6/2017 | Yang | |

FOREIGN PATENT DOCUMENTS

| | | |
|---|---|---|
| CN | 103399425 A | 11/2013 |
| CN | 203720488 U | 7/2014 |
| CN | 104617017 A | 5/2015 |
| CN | 104801472 A | 7/2015 |
| CN | 105140169 A | 12/2015 |

* cited by examiner

*Primary Examiner* — Lucy P Chien

(74) *Attorney, Agent, or Firm* — Brooks Kushman P.C.

(57) ABSTRACT

A substrate support device is provided, including: a support rod movably arranged on a table; a first driving mechanism configured to control the support rod to move in a first direction; a support platform movably arranged on the support rod; a second driving mechanism configured to control the support platform to move in a second direction parallel to a lengthwise direction of the support rod; and a support pin movably arranged on the support platform.

19 Claims, 6 Drawing Sheets

SUBSTRATE SUPPORT DEVICE

CROSS-REFERENCE TO RELATED APPLICATION

The present application claims priority to Chinese patent application No. 201720040214.0 filed on Jan. 13, 2017, which is incorporated herein by reference in its entirety.

TECHNICAL FIELD

The present disclosure relates to the manufacture of a liquid crystal product, in particular to a substrate support device.

BACKGROUND

During the manufacture of a liquid crystal panel, after the coating of a layer in a color filter formation process, it is necessary to perform vacuumization and drying treatment on a substrate, so as to reduce a vacuum degree in an enclosed space, thereby to dry the layer. The layer that has been just coated contains a large number of solvents and is wet, and in the case that a support pin for supporting the substrate is located at an inappropriate position, such quality defects as uneven surface of the layer may easily occur during the vacuumization. During the vacuumizaiton, it is necessary to place the substrate on a support device, and such a defect as uneven surface of the layer may occur at a position where the support device is in contact with the substrate. In order to prevent the occurrence of the above-mentioned detects, it is necessary to place the support device at a non-display region of the substrate, so as to support the substrate.

However, the non-display regions of the substrates may change along with the sizes of the final products, so the support device for support the substrates may be adjustable, so as to support the substrate at an appropriate position. Currently, for the manufacture of a large-size substrate, a size of the product may be set in advance in the case of designing a production line, and then the position where the support device is placed on the substrate may be designed. In the case that the size of the product changes, it is impossible to change the position where the support device is placed on the substrate, and at this time, a new support device has to be provided. In addition, in the related art, the position of the support pin is changed by an operator manually in the device, resulting in a large probability of operational error, a waste of time and effort, and a defective product due to dust brought by the operator into the device.

SUMMARY

An object of the present disclosure is to provide a substrate support device with a movable support pin.

The present disclosure provides in some embodiments a substrate support device, including: a support rod; a first driving mechanism configured to control the support rod to move in a first direction; a support platform movably arranged on the support rod; a second driving mechanism configured to control the support platform to move in a second direction parallel to a lengthwise direction of the support rod; and a support pin arranged on the support platform.

In a possible embodiment of the present disclosure, the first driving mechanism includes: a driving rod; two transmission rods connected to the driving rod in a transmission mode; a sliding block arranged on each transmission rod and connected to a respective end portion of the support rod; and a first driving unit arranged on the driving rod and configured to drive the driving rod to rotate, so as to rotate the transmission rods and thereby drive the support rod to move in the first direction.

In a possible embodiment of the present disclosure, the driving rod is connected to the transmission rods in a magnetic transmission mode, and the transmission rod is connected to the sliding block in a magnetic transmission mode.

In a possible embodiment of the present disclosure, the sliding block includes a connection member, and the support rod is provided with a connection groove corresponding to the connection member.

In a possible embodiment of the present disclosure, a first distance measurement mechanism is arranged at both ends of the driving rod and configured to measure a movement distance of the support rod in the first direction.

In a possible embodiment of the present disclosure, the distance measurement mechanism is configured to measure the movement distance in a laser ranging mode.

In a possible embodiment of the present disclosure, the substrate support device further includes a first adjustment unit configured to control a movement of the first distance measurement mechanism. In the case that a plurality of sliding blocks is arranged on each transmission rod, each sliding block is provided with a first distance measurement hole corresponding to the first distance measurement mechanism, and the first distance measurement hole in the sliding block away from the first distance measurement mechanism is smaller than the first distance measurement hole in the sliding block adjacent to the first distance measurement mechanism.

In a possible embodiment of the present disclosure, the second driving mechanism includes: a transmission member connected to a transmission shaft on the support rod in a transmission mode and arranged on the sliding block; a sliding rail arranged on the support rod; a sliding member slidably arranged in the sliding rail and arranged on the support platform; and a second driving unit arranged on the sliding block and configured to drive the transmission member to rotate, so as to drive the transmission shaft to rotate and thereby drive the support platform to move in the second direction.

In a possible embodiment of the present disclosure, two sliding members are arranged respectively at two sides on a lower surface of a body of the support platform, the support rod includes an intermediate portion where the transmission shaft is arranged, the sliding rail includes two sliding grooves arranged at two sides of the intermediate portion respectively, and the sliding member is slidably embedded into the corresponding sliding groove.

In a possible embodiment of the present disclosure, an end surface at an opening of one of the two sliding grooves is located at a level different from an end surface at an opening of the other one of the two sliding grooves.

In a possible embodiment of the present disclosure, the transmission member is connected to the transmission shaft in a magnetic transmission mode.

In a possible embodiment of the present disclosure, a second distance measurement mechanism is arranged on the sliding block and configured to measure a movement distance of the support platform in the second direction.

In a possible embodiment of the present disclosure, the substrate support device further includes a second adjustment unit configured to control a movement of the second distance measurement mechanism. In the case that a plurality of support platforms is arranged on the support rod, each support platform is provided with a second distance measurement hole corresponding to the second distance measurement mechanism, and the second distance measurement hole in the support platform away from the second distance measurement mechanism is smaller than the second distance measurement hole in the support platform adjacent to the second distance measurement mechanism.

In a possible embodiment of the present disclosure, the substrate support device further includes a third driving mechanism configured to control the support pin to move in the first direction.

In a possible embodiment of the present disclosure, the third driving mechanism is arranged on the support platform and includes: a sliding member arranged on the support platform; a delimiting groove arranged in the support platform, the support pin being movably arranged in the delimiting groove; and a third driving unit configured to drive, through the sliding member, the support pin to move in the first direction.

In a possible embodiment of the present disclosure, a third distance measurement mechanism is arranged on the support platform and configured to measure a movement distance of the support pin in the first direction.

BRIEF DESCRIPTION OF THE DRAWINGS

In order to illustrate the technical solutions of the present disclosure in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

Figure 1:
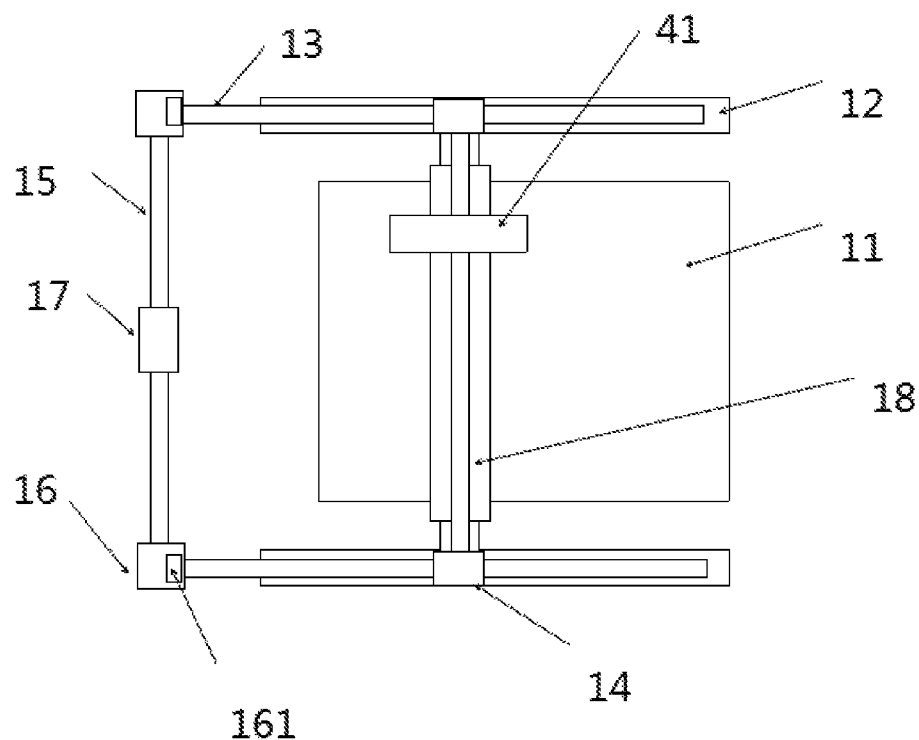
FIG. 1 is a schematic view showing a substrate support device according to one embodiment of the present disclosure.
Figure 2:
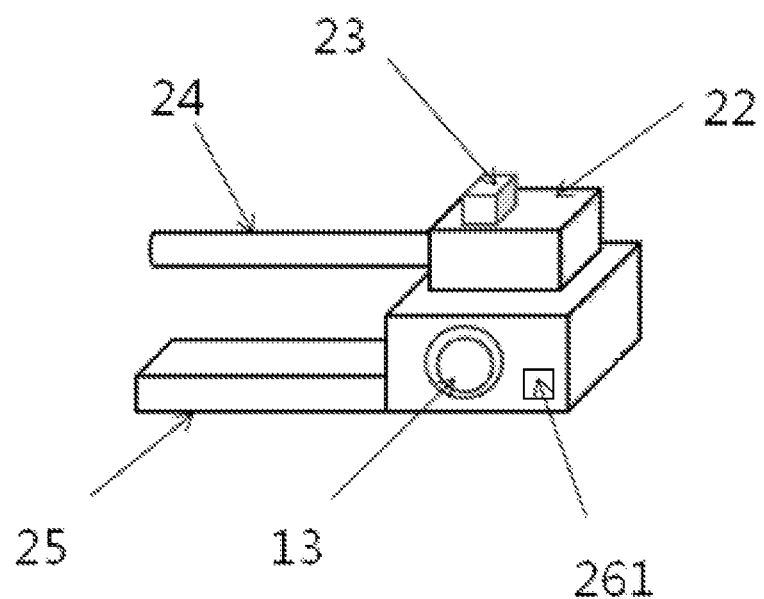
FIG. 2 is a schematic view showing a sliding block according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

As shown in FIGS. 1 to 11, the present disclosure provides in some embodiments a substrate support device, which includes: a support rod 18 movably arranged on a table 11; a first driving mechanism configured to control the support rod 18 to move in a first direction; a support platform 41 movably arranged on the support rod 18; a second driving mechanism configured to control the support platform 41 to move in a second direction parallel to a lengthwise direction of the support rod 18; a support pin 43 movably arranged on the support platform 41; and a third driving mechanism configured to control the support pin 43 to move in the first direction.

According to the embodiments of the present disclosure, the first driving mechanism controls the support rod 18 to move in the first direction, the second driving mechanism controls the support platform 41 to move in the second direction (i.e., it may roughly adjust the position of the support pin 43 on the support platform 41), and the third driving mechanism controls the support pin 43 to move in the first direction (i.e., it may finely adjust the support pin 43). As a result, it is able to automatically move the support pin 43 voluntarily at a region corresponding to a substrate, so as to save manpower and prevent the occurrence of pollution.

The first driving mechanism may be of any one of various structures, as long as it may control the support rod 18 to move in the first direction. In a possible embodiment of the present disclosure, the first driving mechanism includes: a driving rod 15 arranged at a first side of the table 11; two transmission rods 13 connected to the driving rod 15 in a transmission mode and arranged at a second side and a third side opposite to the table 11 respectively; a sliding block 14 arranged on each transmission rod 13 and connected to a respective end portion of the support rod 18; and a first driving unit 17 arranged on the driving rod 15 and configured to drive the driving rod 15 to rotate, so as to drive the transmission rod 13 to rotate and thereby drive the support rod 18 to move in the first direction.

A follower unit 16 is further arranged at a connection between the transmission rod 13 and the driving rod 15, so as to be driven by the first driving unit 17, thereby to drive the transmission rod 13 to rotate.

In a possible embodiment of the present disclosure, the driving rod 15 is connected to the transmission rod 13 in a magnetic transmission mode, and the transmission rod 13 is connected to the sliding block 14 in a magnetic transmission mode.

The first driving unit 17 may be configured to drive the driving rod 15 to rotate, and the transmission rod 13 may be rotated through the magnetic connection between the driving rod 15 and the transmission rod 13. The sliding block 14 may be driven by the transmission rod 13 to move back and forth (in the first direction, i.e., a lengthwise direction of the transmission rod 13 in FIG. 1) through the magnetic connection between the transmission rod 13 and the sliding block 14, and then the sliding block 14 may drive the support rod 18 to move voluntarily on the table 11.

Figure 4:
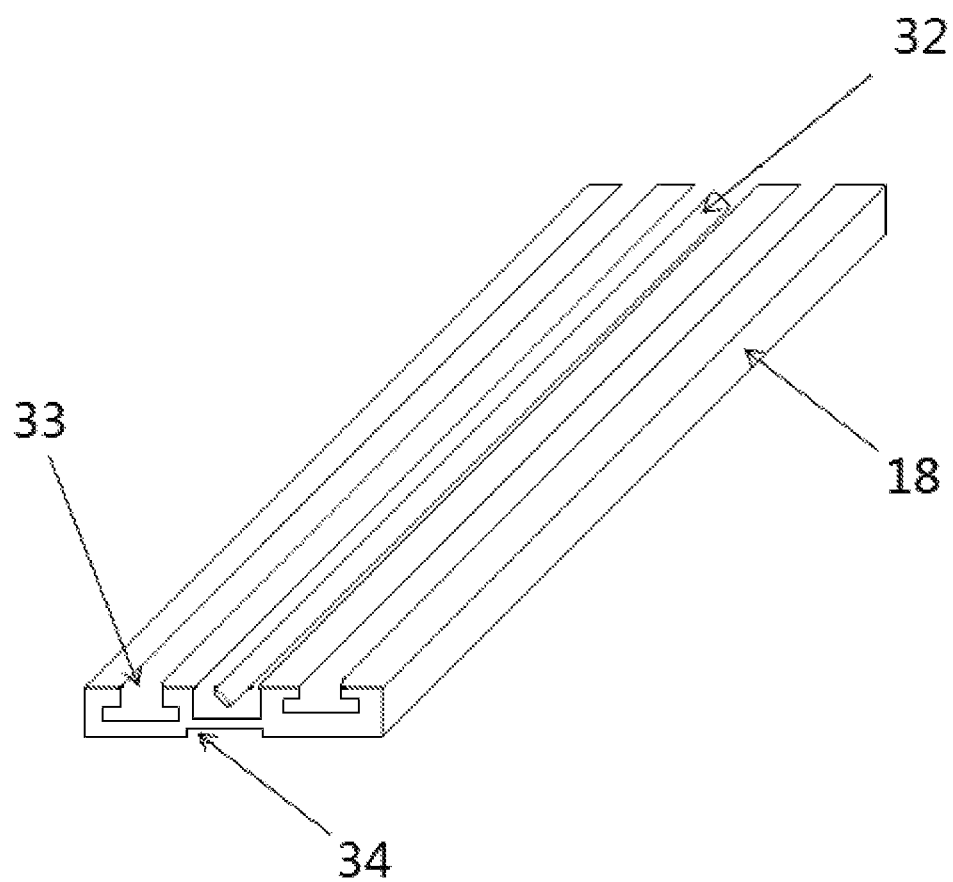
FIG. 4 is a schematic view showing a support rod according to one embodiment of the present disclosure.

In a possible embodiment of the present disclosure, the sliding block 14 may be connected to the support rod 18 through, but not limited to, insertion. To be specific, the sliding block 14 includes a connection member 25, and the support rod 18 is provided with a connection groove 34 corresponding to the connection member 25, as shown in FIG. 4.

In a possible embodiment of the present disclosure, the transmission rod 13 is arranged on a first sliding rail 12 which is provide with a sliding groove into which the sliding block 14 may be embedded. A plurality of independently-controlled first control units is arranged inside the sliding groove in the first sliding rail 12. Each first control unit is energized or deenergized so as to enable the sliding block 14 to be driven or not driven by the transmission rod 13.

The transmission rod 13 may be provided alternately, in its lengthwise direction, with first magnetic mechanisms and second magnetic mechanisms with different magnetic properties. At its surface adjacent to the transmission rod 13, the sliding block 14 may be provided with different magnetic properties at a front end and a rear end relative to the transmission rode 13 respectively. For example, in the case that a front end of the sliding block 14, along its movement direction, is an N pole and the transmission rod 13 has rotated to a position where its S pole is located opposite to the N pole of the sliding block 14, the transmission rod 13 may attract the sliding block 14, so as to pull the sliding block 14 to move forward relative to the transmission rod 13. Meanwhile, an N pole of the transmission rod 13 may be repelled by a rear end of the sliding block 14, i.e., an N pole of the sliding block 14, so as to push the sliding block 14 to move forward. During the rotation of the transmission rod 13, its N pole and S pole may be alternately located opposite to the sliding block 14, and the polarities of two ends of the sliding block 14 at a side adjacent to the transmission rod 13 may be changed alternately through electromagnetic transformation accordingly. In the above-mentioned way, it is able to drive the sliding block 14 to move to a specified position through the rotation of the transmission rod 13.

In the case that the transmission rod 13 is provided with a plurality of sliding blocks 14 and one of the sliding blocks 14 needs to be moved, it is merely necessary to deenergize the first control unit of the transmission rod 13 corresponding to the sliding block 14 to be moved. At this time, the magnetic adsorption between the sliding block 14 and the transmission rod 13 may be removed, so the sliding block 14 may be driven by the transmission rod 13 to move through the magnetic transformation (meanwhile, the first control units corresponding to the other sliding blocks 14 are energized, so they may be adsorbed and fixed onto the transmission rod 13, so in the case that the sliding block 14 is being moved, the other sliding blocks 14 are not affected). In the case that the sliding block has moved to a predetermined position, the first control unit corresponding to the sliding block 14 may be energized, so as to generate the magnetic adsorption between the sliding block 14 and the transmission rod 13, thereby to enable the sliding block 14 to be fixed onto the transmission rod 13.

In order to enable the support rod 18 to be moved to accurately a predetermined position, in a possible embodiment of the present disclosure, a first distance measurement mechanism 161 may be arranged at two ends of the driving rod 15 and configured to measure a movement distance of the support rod 18 in the first direction.

Alternatively, the first distance measurement mechanism 161 may also be arranged on each sliding block 14, as long as it is able to measure the movement distance of the support rod 18 in the first direction.

In a possible embodiment of the present disclosure, the first distance measurement mechanism 161 may measure the movement distance in a laser ranging mode.

Figure 3:
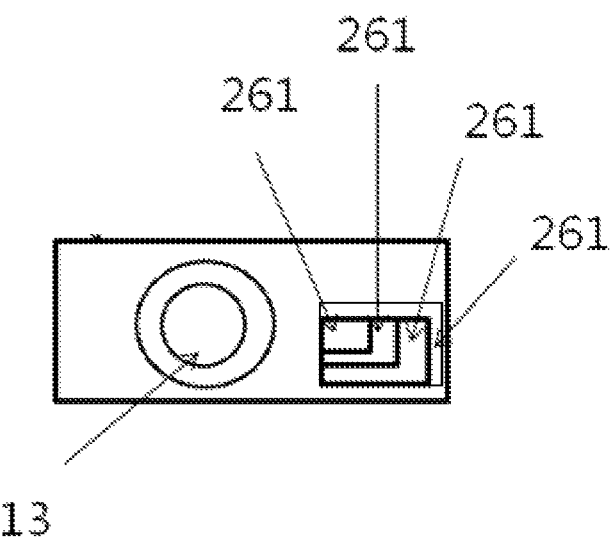
FIG. 3 is a left view of a transmission rod according to one embodiment of the present disclosure.

In a possible embodiment of the present disclosure, the substrate support device may further include a first adjustment unit configured to control the movement of the first distance measurement mechanism. In the case that a plurality of sliding blocks is arranged on each transmission rod, each sliding block is provided with a first distance measurement hole corresponding to the first distance measurement mechanism, and the first distance measurement hole in the sliding block away from the first distance measurement mechanism is smaller than the first distance measurement hole in the sliding block adjacent to the first distance measurement mechanism, as shown in FIG. 3.

Through the first adjustment unit, it is able to finely adjust a position of the first distance measurement mechanism 161 automatically, so as to measure a movement distance of the respective sliding block 14, thereby to acquire the movement distance of the support rod 18 in the first direction. As shown in FIG. 3 which is a left view of the transmission rod, in the case that the substrate support device includes four support rods 18, i.e., four sliding blocks 14 (i.e., A, B, C and D) are arranged on each transmission rod 13, one first distance measurement hole 261 may be arranged in each sliding block 14. An area of the first distance measurement hole 261 in the sliding block 14 adjacent to the first distance measurement mechanism 161 may be greater than an area of the first distance measurement hole 261 in the sliding block 14 away from the first distance measurement hole 261. In other words, as viewed from left, the first distance measurement holes in the sliding block B, the sliding block C and the sliding block D may be viewed in sequence from the first distance measurement hole 261 in the sliding block A, and parts of the sliding blocks B, C and D at the edges of the first distance measurement holes 261 may be viewed through the first distance measurement hole 261 in the sliding block A. In this regard, it is able to finely adjust the position of the first distance measurement mechanism, so as to transmit a laser beam through the first distance measurement hole 261 in one sliding block 14 to another sliding block 14 for the distance measurement.

In a possible embodiment of the present disclosure, the areas of the first distance measurement holes in the sliding blocks 14 gradually decrease in a direction away from the first distance measurement mechanism 161.

In a possible embodiment of the present disclosure, the transmission rod 13 may include a first end away from the first distance measurement mechanism 161, and the sliding block 14 adjacent to the first end may not be provided with the first distance measurement hole. In other words, a part of the sliding block 14 may be exposed through the first distance measurement hole in the sliding block C, so as to facilitate the distance measurement using the laser beam by the first distance measurement mechanism.

The sliding blocks 14 on the transmission rod 13 may be of various structures (i.e., they may have the first distance measurement holes in different sizes). In the case that there is a plurality of support rods 18 on a surface of the table 11, the respective position of each of the sliding blocks 14 may be determined in an extending direction of the transmission rod 13 after the position of the first distance measurement mechanism 161 has been automatically and finely adjusted, so as to control and adjust a position of an individual support rod 18 without being affected by the other support rods 18.

The second driving mechanism may be any one of various structures, as long as it can control the support platform 41 to move in the second direction. In a possible embodiment of the present disclosure, as shown in FIGS. 2 to 6, the second driving mechanism may include: a transmission member 24 connected to a transmission shaft 32 on the support rod 18 in a transmission mode and arranged on the sliding block 14; a second sliding rail 33 arranged on the support rod 18; a sliding member 411 slidably arranged in the second sliding rail 33 and arranged on the support platform 41; and a second driving unit 22 arranged on the sliding block 14 and configured to drive the transmission member 24 to rotate, so as to drive the transmission shaft 32 to rotate, thereby to drive the support platform 41 to move in the second direction.

In a possible embodiment of the present disclosure, the transmission member 24 may be connected to the transmission shaft 32 in a magnetic transmission mode.

In order to move the support platform 41 to the predetermined position accurately, in a possible embodiment of the present disclosure, a second distance measurement mechanism 23 may be arranged on the sliding block 14 and configured to measure the movement distance of the support platform 41 in the second direction.

Figure 5:
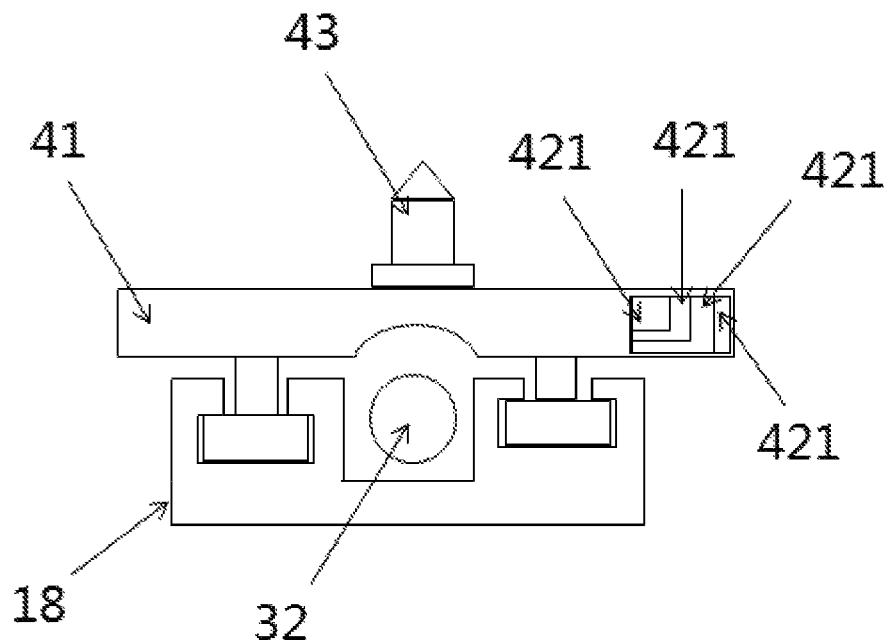
FIG. 5 is a schematic view showing a connection mode between a support platform and the support rod according to one embodiment of the present disclosure.

The substrate support device may further include a second adjustment unit configured to control the movement of the second distance measurement mechanism. In the case that a plurality of support platforms 14 is arranged on the support rod 18, a second distance measurement hole 421 corresponding to the second distance measurement mechanism 23 may be arranged in each support platform 41. The second distance measurement hole 421 in the support platform 41 away from the second distance measurement mechanism 23 is smaller than the second distance measurement hole 421 in the support platform 41 adjacent to the second distance measurement mechanism 23. In the case that the plurality of support platforms 41 are arranged on the support rod 18, the position of each support platform 41 may be determined through the second distance measurement hole 421 in each support platform 41 in an extending direction of the support rod 18 after the position of the second distance measurement mechanism 23 on the sliding block 14 has been automatically and finely adjusted, so as to control the movement distance of the support platform 41 on the support rod 18, as shown in FIG. 5.

For example, four support platforms A, B, C and D may be arranged on the support rod 18, and an area of the second distance measurement hole 421 in the support platform 41 adjacent to the second distance measurement mechanism 23 may be greater than an area of the second distance measurement hole 421 in the support platform 41 away from the second distance measurement mechanism 23. In other words, as viewed from the left, the second distance measurement holes in the support platform B, the support platform C and the support platform D may be viewed from the second distance measurement hole 421 in the support platform A, and parts of the support platforms B, C and D at the edges of the second distance measurement holes 421 may be viewed through the second distance measurement hole 421 in the support platform A. In this regard, it is able to finely adjust the position of the second distance measurement mechanism 23, so as to transmit a laser beam through the second distance measurement hole 421 in one support platform 41 to another support platform 41 for the distance measurement.

In a possible embodiment of the present disclosure, the areas of the second distance measurement holes 421 in the support platforms 41 gradually decrease in a direction away from the second distance measurement mechanism 23.

In a possible embodiment of the present disclosure, the support rod 13 may include a second end away from the second distance measurement mechanism 23, and the support platform 41 adjacent to the second end may not be provided with the second distance measurement hole 421. In other words, a part of the support platform D may be exposed through the second distance measurement hole in the support platform C, so as to facilitate the distance measurement using the laser beam by the second distance measurement mechanism.

The support platform 41 may include a body and two sliding members 411 arranged respectively at two sides on a lower surface of the body. The support rod 18 may include an intermediate portion where the transmission shaft 32 is arranged. The second sliding rail 33 includes two sliding grooves arranged at two sides of the intermediate portion respectively, and each sliding member 411 may be movably embedded into the corresponding sliding groove.

Figure 6:
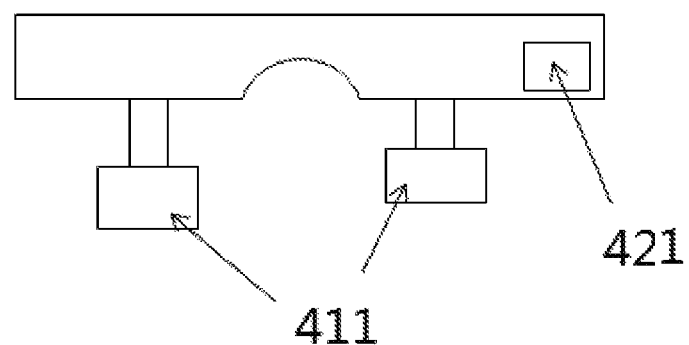
FIG. 6 is a schematic view showing the support platform according to one embodiment of the present disclosure.
Figure 7:
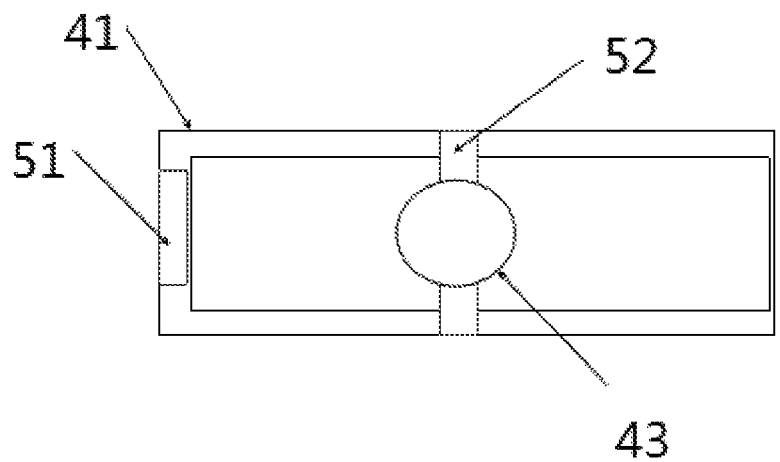
FIG. 7 is a top view of the support platform according to one embodiment of the present disclosure.

In a possible embodiment of the present disclosure, two ends of the second sliding rail 33 may be at different heights (i.e., an end surface at an opening of one of the two sliding grooves may be located at a level different from an end surface at an opening of the other one of the two sliding grooves). Correspondingly, the two sliding members 411 on the support platform 41 may be of different heights, as shown in FIG. 6, so as to fix the support platform 41 relative to a mounting direction of the support rod 18.

Figure 8:
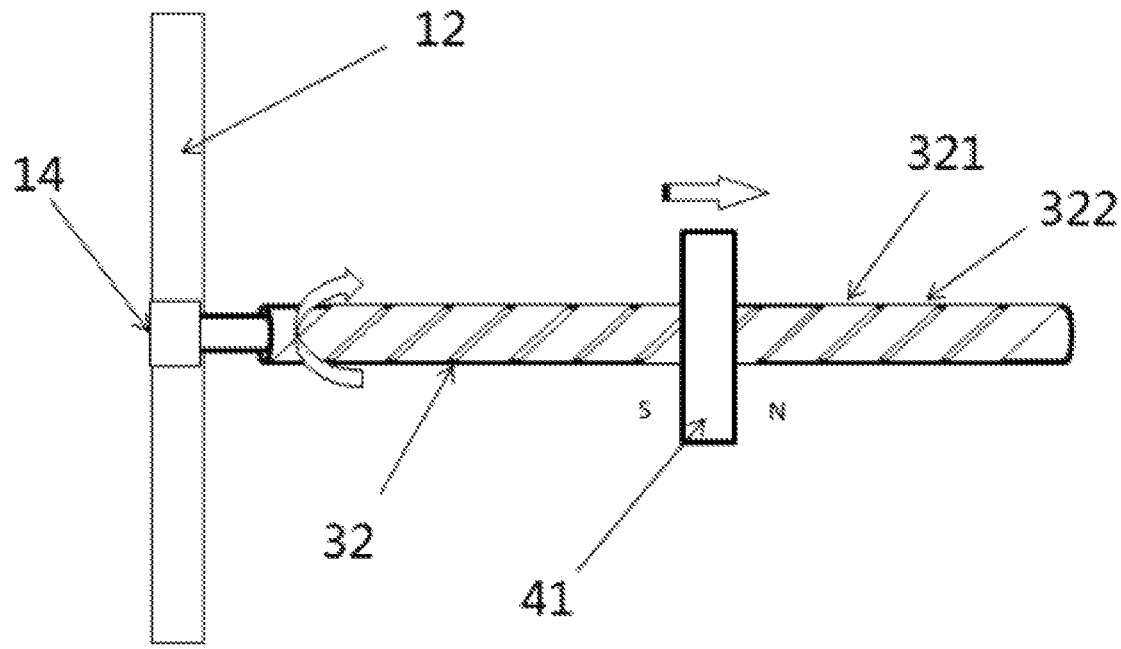
FIG. 8 is a schematic view showing a movement mode of the support platform according to one embodiment of the present disclosure.
Figure 9:
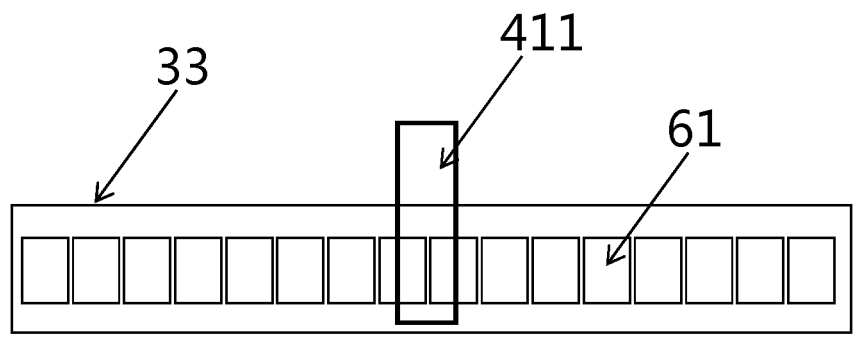
FIG. 9 is a schematic view showing a connection portion between the support platform and the support rod according to one embodiment of the present disclosure.

The transmission shaft 32 may drive the support platform 41 to move in an identical way to that the transmission rod 13 drives the support rod 18 to move through the sliding block 14. As shown in FIGS. 8 and 9, the movement of the support platform 41 driven by the transmission shaft 32 will be described hereinafter.

A plurality of independently-controlled second control units 61 may be arranged at two sides of an interior of the second sliding rail 33 on the support rod 18. After the support platform 41 is mounted onto the second sliding rail 33, the second control unit 61 may be energized or deenergized, so as to enable the support platform 41 to be affected or not affected by the transmission shaft 32.

During the rotation, the transmission shaft 32 on the intermediate portion of the support rod 18 may drive the support platform 41 to move in the lengthwise direction of the transmission rod 18 under the effect of magnetism. The second distance measurement mechanism 23 on the sliding block 14 may accurately measure the movement distance of the support platform 41. After the support platform 41 has moved a predetermined movement distance, the second control unit 61 arranged on the second sliding rail 33 at both sides of the support rod 18 and arranged in contact with the sliding member 411 of the support platform 41 may be deenergized. At this time, a lower surface of the support platform 41 above the transmission shaft 32 may lose its magnetism due to the deenergization, and the support platform 41 may not be affected by the rotation of the transmission shaft 32 any more. In addition, after the second control unit 61 has been deenergized, the sliding member 411 at two sides of the support platform 41 may be magnetic, and may magnetically adsorb the second sliding rail 33 at the two sides of the support rod 18, so as to fix the support platform 41 relative to the support rod 18 after the support platform 41 has moved to the predetermined position without any position offset.

As shown in FIG. 8, along its lengthwise direction, the transmission shaft 32 may include third magnetic mechanisms 321 and fourth magnetic mechanisms 322 arranged alternately and having different magnetic properties, and a surface of the support platform 41 adjacent to the transmission shaft 32 may be provided with two different magnetic properties at a front end and a rear end relative to the transmission shaft 32 respectively. For example, in the case that a front end of the support platform 41, along its movement direction, is an N pole and the transmission shaft 32 has rotated to a position where its S pole is located opposite to the N pole of the support platform 41, the transmission shaft 32 may attract the support platform 41, so as to pull the support platform 41 to move forward relative to the transmission shaft 32. Meanwhile, an N pole of the transmission shaft 32 may be repelled by a rear end of the support platform 41, i.e., an N pole of the support platform 41, so as to push the support platform 41 to move forward. Accordingly, during the rotation of the transmission shaft 32, its N pole and S pole may be alternately located opposite to the support platform 41, and the polarities of two ends of the support platform 41 at a side adjacent to the transmission shaft 32 may be changed alternately through electromagnetic transformation. In the above-mentioned way, it is able to drive the support platform 41 to move to a specified position through the rotation of the transmission shaft 32.

In the case that it is necessary to adjust the position of the support platform 41, the control unit in contact with the sliding member 411 at a lower end of the support platform 41 may be deenergized, so as to remove the magnetic adsorption between the support platform 41 and the support rod 18. In addition, a portion of the support platform 41 at a side adjacent to the transmission shaft 32 may be magnetic, so that the support platform 41 may move to the specified position through the rotation of the transmission shaft 32.

The third driving mechanism may be of any one of various structures, as long as it can move the support pin 43. In a possible embodiment of the present disclosure, the third driving mechanism may be arranged on the support platform 41, and include: a sliding member 52 arranged on the support platform 41; a delimiting groove arranged in the support platform 41, the support pin 43 being movably arranged in the delimiting groove; and a third driving unit 51 configured to drive the support pin 43 to move in the first direction through the sliding member 52.

The movement of the support pin 43 on the support platform 41 is used for finely adjusting, so as to ensure the support pin 43 to move to an appropriate position.

Further, a third distance measurement mechanism 42 may be arranged on the support platform 41 and configured to measure a movement distance of the support pin 43 in the first direction.

The support pin 43 may be arranged in a circular groove of a positioning mechanism at an upper surface of the support platform 41 and fixedly connected to the positioning mechanism in a magnetic manner. The sliding member may drive the support pin 43 to move left and right. The movement distance of the support pin 43 relative to the support platform 41 may be accurately controlled through the third distance measurement mechanism 42.

The movement of the support rod 18, the support platform 41 and the support pin 43 may be controlled automatically through a Programmable Logic Controller (PLC) system.

In order to facilitate the operation, coordinates of the position of the support pin 43 may be set relative to the table 11. In the case that it is necessary to place the support pin 43 at a specified position on the table 11, the coordinates of the position of the support pin 43 may be directly input on a control panel of the PLC system. Then, the PLC system may, in accordance with the coordinates, automatically control the first driving mechanism of the substrate support device to drive the support rod 18 to move, control the second driving mechanism to drive the support platform 41 to move, and control the third driving mechanism to drive the support pin 43 to move. More details will be given as follows.

Figure 10:
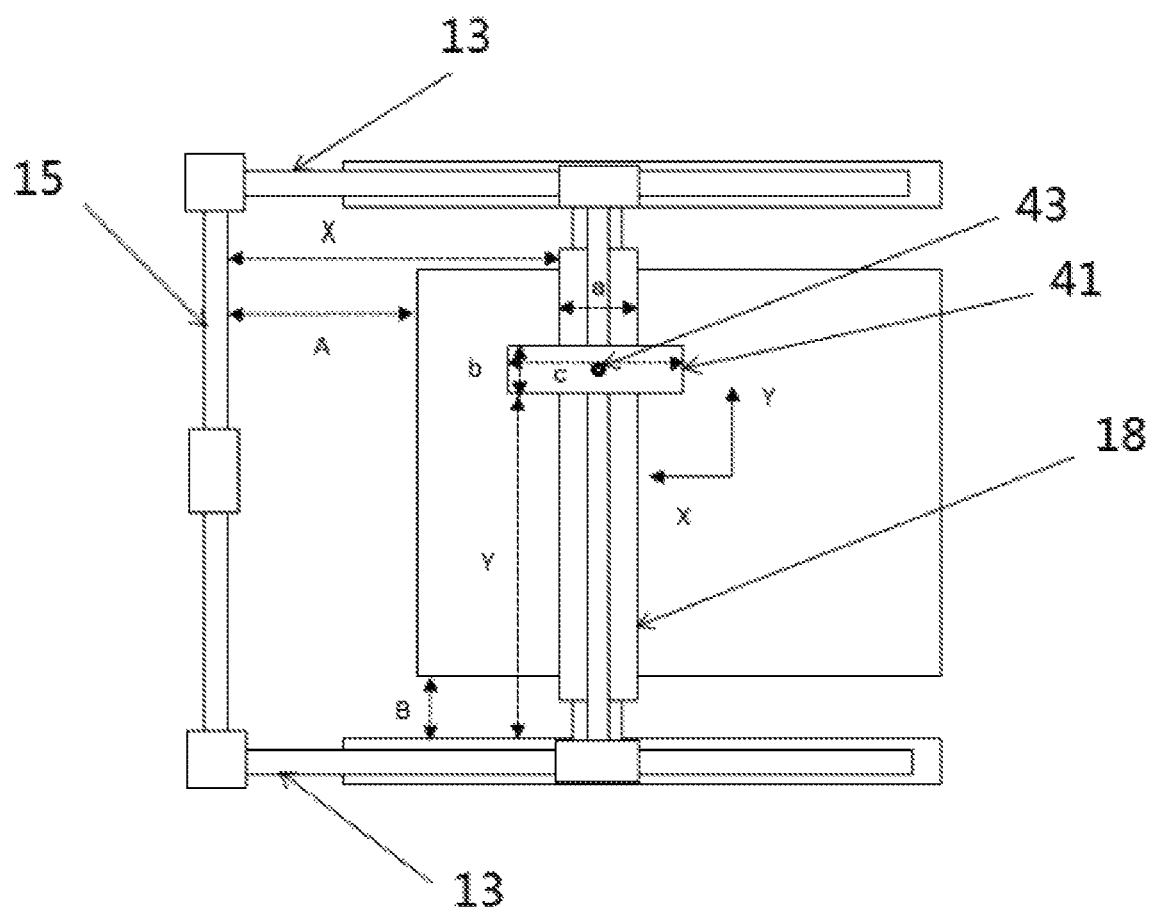
FIG. 10 is a schematic view showing a movement mode of a support pin according to one embodiment of the present disclosure.

As shown in FIG. 10, in the case that the support pin 43 is to be placed at a position of coordinates M (100, 200), the coordinates may be directly input on the control plane of the PLC system. After the coordinates are processed by a system program, the first driving unit 17 may drive the transmission rod 13 to rotate, and then the transmission rod 13 may drive the sliding block 14 to move through magnetic transmission. In the case that a distance X (A+100−a/2) (where A represents a distance between the first distance measurement mechanism 161 and the table 11, and a represents a width of the support rod 18) is acquired by the first distance measurement mechanism 161, the first driving unit 17 may stop working, and at this time, the support rod 18 has moved to the specified position. In addition, the second driving unit 22 may drive transmission shaft 32 on the support rod 18 to rotate, and then the transmission shaft 32 may drive the support platform 41 to move through the magnetic transmission. In the case that a distance Y (B+200−b/2) (where B represents a distance between the second distance measurement mechanism and the table 11, and b represents a width of the support platform 41) is acquired by the second distance measurement mechanism 2, the second driving unit 22 may stop working, and at this time, the support platform 41 has moved to the specified position. The third driving unit 51 may control the movement of the support pin 43 on the support platform 41, until a distance acquired by the third distance measurement mechanism 42 is equal to c/2 (where c represents a length of the support platform 41). Through the above steps, it is able to place the support pin 43 at the position of the coordinates M (100, 200).

Figure 11:
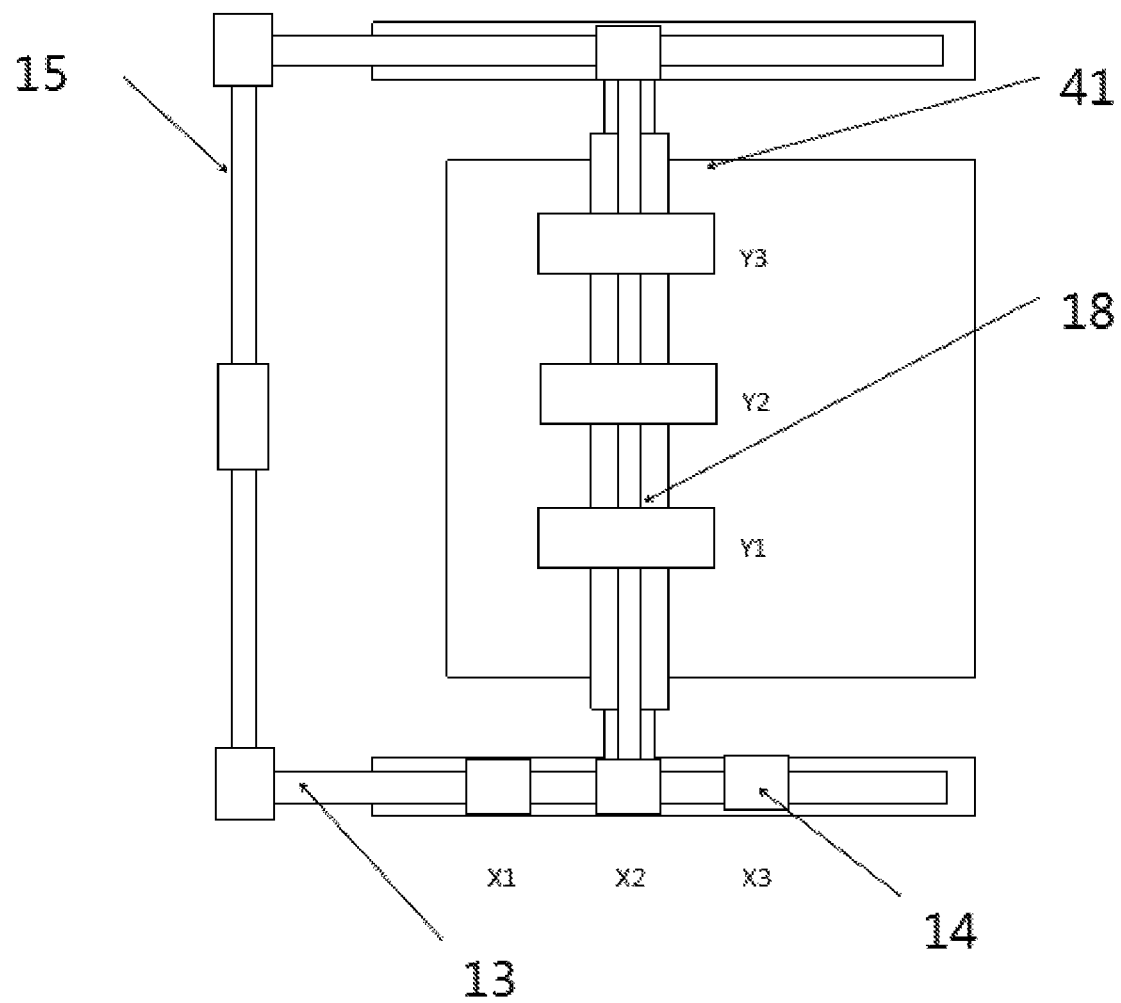
FIG. 11 is a schematic view showing the substrate support device with a plurality of support pins according to one embodiment of the present disclosure.

During the actual application, usually it is necessary to adjust the positions of a plurality of support pins 43 simultaneously. In order to facilitate the adjustment, the sliding blocks 14 on an identical transmission rod 13 may each be of a structure as shown in FIG. 11. Through the adjustment of the position of the first distance measurement mechanism 161, it is able to control and measure the movement distances of different sliding blocks 14. The position of the support platform 41 where the support pin 43 is located, the position of the support rod 18 where the support platform 41 is located, and the position of the sliding block 14 corresponding to the support rod 18 may be adjusted according to the practical need. The positions of the corresponding distance measurement mechanisms may be adjusted, so as to measure the movement distance of the support rod 18, the movement distance of the support platform 41 and the movement distance of the support pin 43 according to the practical need.

In the case that it is necessary to move the support pin 43 on the support platform 41Y3 on the support rod 18 corresponding to the sliding block 14X2 to the position of the coordinates (100, 200) in FIG. 11, it is merely necessary for the PLC system to select a serial number (X2, Y3) corresponding to the support platform 41Y3, so as to, through the PLC system, automatically adjust the first distance measurement mechanism 161 to a position where the movement distance of the sliding block 14X2 is capable of being measured, and automatically adjust the second distance measurement mechanism 23 to a position where the movement distance of the support platform 41Y3 is capable of being measured. Under the control of the PLC system, the first driving unit 17 may drive the sliding block 14 to move, and the second driving unit 22 may drive the support platform 41 to move, so as to move the support pin 43 on the support platform 41Y3.

During the movement of the specified support pin 43, the positions of the other support pins 43 and the movement of the specified support pin 43 may not interfere with each other.

In the case that it is necessary to reduce the number of the support rods 18 on the surface of the table 11, the sliding blocks 14 at two ends of each support rod 18 may be moved to the left and right sides of the table 11, and then the support rod 18 may be placed at a region not interfering with the table 11. At this time, upon the electromagnetic transformation, the connection member 25 of each sliding block 14 and the transmission member 24 may lose their magnetic properties, and thereby may be disconnected from the support rod 18. Identically, in the case that it is necessary to increase the number of the support rods 18 on the surface of the table 11, the sliding block 14 may be moved to a position where a new support rod 18 is to be located. At this time, upon the electromagnetic transformation, the magnetic properties of the connection member 25 and the transmission member 24 may be recovered, and thereby may be connected to the support rod 18, so as to fix the support rod 18 and move the support rod 18 to the specified position on the table 11.

In a possible embodiment of the present disclosure, the first driving unit, the second driving unit, the third driving unit, or the like may be implemented by an electric motor, an electric machine, or any other common driving machine driven by a power source, e.g. electric power or hydraulic force.

In a possible embodiment of the present disclosure, the first adjustment unit, the second adjustment unit or the like may be implemented by an electric motor, an electric machine, an actuator of a Micro Electro Mechanical System (MEMS), or any other common driving machine driven by a power source, e.g. electric power or hydraulic force.

In a possible embodiment of the present disclosure, the first control unit, the second control unit or the like may be implemented by a switch, electric relay or any other device capable of turning on/off a circuit.

In a possible embodiment of the present disclosure, the PLC system may be implemented by, e.g. a Central Unit Processor (CPU), a Field Programmable Gate Array (FPGA), a Micro Controller Unit (MCU), or a Digital Signal Processor (DSP).

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A substrate support device, comprising:
a support rod;
a first driving mechanism configured to control the support rod to move in a first direction;
a support platform movably arranged on the support rod;
a second driving mechanism configured to control the support platform to move in a second direction parallel to a lengthwise direction of the support rod; and
a support pin arranged on the support platform,
wherein the first driving mechanism comprises:
a driving rod;
two transmission rods connected to the driving rod in a transmission mode;
a sliding block arranged on each of the transmission rods and connected to a respective end portion of the support rod; and
a first driving unit arranged on the driving rod and configured to drive the driving rod to rotate, to drive the transmission rods to rotate and drive the support rod to move in the first direction.

2. The substrate support device according to claim 1, wherein the driving rod is connected to the transmission rods in a magnetic transmission mode, and the transmission rod is connected to the sliding block in a magnetic transmission mode.

3. The substrate support device according to claim 1, wherein the sliding block comprises a connection member, and the support rod is provided with a connection groove corresponding to the connection member.

4. The substrate support device according to claim 1, wherein a first distance measurement mechanism is arranged at both ends of the driving rod and configured to measure a movement distance of the support rod in the first direction.

5. The substrate support device according to claim 4, wherein the distance measurement mechanism is configured to measure the movement distance in a laser ranging mode.

6. The substrate support device according to claim 4, further comprising a first adjustment unit configured to control a movement of the first distance measurement mechanism, wherein in the case that a plurality of sliding blocks is arranged on each of the transmission rods, each of the sliding blocks is provided with a first distance measurement hole corresponding to the first distance measurement mechanism, and the first distance measurement hole in the sliding block away from the first distance measurement mechanism is smaller than the first distance measurement hole in the sliding block adjacent to the first distance measurement mechanism.

7. The substrate support device according to claim 1, wherein the second driving mechanism comprises:
a transmission member connected to a transmission shaft on the support rod in a transmission mode and arranged on the sliding block;
a sliding rail arranged on the support rod;
a sliding member slidably arranged in the sliding rail and arranged on the support platform; and
a second driving unit arranged on the sliding block and configured to drive the transmission member to rotate, to drive the transmission shaft to rotate and drive the support platform to move in the second direction.

8. The substrate support device according to claim 7, wherein two sliding members are arranged respectively at two sides on a lower surface of a body of the support platform, the support rod comprises an intermediate portion where the transmission shaft is arranged, the sliding rail comprises two sliding grooves arranged at two sides of the intermediate portion respectively, and the sliding member is slidably embedded into the corresponding sliding groove.

9. The substrate support device according to claim 8, wherein an end surface at an opening of one of the two sliding grooves is located at a level different from an end surface at an opening of the other one of the two sliding grooves.

10. The substrate support device according to claim 7, wherein the transmission member is connected to the transmission shaft in a magnetic transmission mode.

11. The substrate support device according to claim 7, wherein a second distance measurement mechanism is arranged on the sliding block and configured to measure a movement distance of the support platform in the second direction.

12. The substrate support device according to claim 11, further comprising a second adjustment unit configured to control a movement of the second distance measurement mechanism, wherein in the case that a plurality of support platforms is arranged on the support rod, each of the support platforms is provided with a second distance measurement hole corresponding to the second distance measurement mechanism, and the second distance measurement hole in the support platform away from the second distance measurement mechanism is smaller than the second distance measurement hole in the support platform adjacent to the second distance measurement mechanism.

13. The substrate support device according to claim 1, further comprising a third driving mechanism configured to control the support pin to move in the first direction.

14. The substrate support device according to claim 13, wherein the third driving mechanism is arranged on the support platform and comprises:
a sliding member arranged on the support platform;
a delimiting groove arranged in the support platform, wherein the support pin is movably arranged in the delimiting groove; and
a third driving unit configured to drive, through the sliding member, the support pin to move in the first direction.

15. The substrate support device according to claim 14, wherein a third distance measurement mechanism is arranged on the support platform and configured to measure a movement distance of the support pin in the first direction.

16. The substrate support device according to claim 2, wherein the sliding block comprises a connection member, and the support rod is provided with a connection groove corresponding to the connection member.

17. The substrate support device according to claim 2, wherein a first distance measurement mechanism is arranged at both ends of the driving rod and configured to measure a movement distance of the support rod in the first direction.

18. The substrate support device according to claim 17, further comprising a first adjustment unit configured to control a movement of the first distance measurement mechanism, wherein in the case that a plurality of sliding blocks is arranged on each of the transmission rods, each of the sliding blocks is provided with a first distance measurement hole corresponding to the first distance measurement mechanism, and the first distance measurement hole in the sliding block away from the first distance measurement mechanism is smaller than the first distance measurement hole in the sliding block adjacent to the first distance measurement mechanism.

19. The substrate support device according to claim 2, wherein the second driving mechanism comprises:
a transmission member connected to a transmission shaft on the support rod in a transmission mode and arranged on the sliding block;
a sliding rail arranged on the support rod;
a sliding member slidably arranged in the sliding rail and arranged on the support platform; and
a second driving unit arranged on the sliding block and configured to drive the transmission member to rotate, to drive the transmission shaft to rotate and drive the support platform to move in the second direction.

* * * * *